US012190063B1

(12) United States Patent
Shrimal et al.

(10) Patent No.: US 12,190,063 B1
(45) Date of Patent: Jan. 7, 2025

(54) SYSTEMS FOR MULTIPLE NAMED ENTITY RECOGNITION

(71) Applicant: AMAZON TECHNOLOGIES, INC., Seattle, WA (US)

(72) Inventors: Anubhav Shrimal, Jaipur (IN); Avi Jain, Jersey City, NJ (US); Kartik Mehta, Sunnyvale, CA (US); Promod Yenigalla, Bangalore (IN)

(73) Assignee: AMAZON TECHNOLOGIES, INC., Seattle, WA (US)

(*) Notice: Subject to any disclaimer, the term of this patent is extended or adjusted under 35 U.S.C. 154(b) by 321 days.

(21) Appl. No.: 17/804,887

(22) Filed: Jun. 1, 2022

(51) Int. Cl.
*G06F 40/295* (2020.01)
*G06F 40/284* (2020.01)

(52) U.S. Cl.
CPC .......... *G06F 40/295* (2020.01); *G06F 40/284* (2020.01)

(58) Field of Classification Search
USPC ............................................. 704/7–10, 257
See application file for complete search history.

(56) References Cited

U.S. PATENT DOCUMENTS

| | | | |
|---|---|---|---|
| 2009/0144609 A1* | 6/2009 | Liang | G06F 40/284 707/999.005 |
| 2022/0277142 A1* | 9/2022 | Mohan | G06F 16/3329 |
| 2022/0277143 A1* | 9/2022 | Jayarao | G06F 40/295 |
| 2023/0061731 A1* | 3/2023 | Sengupta | G06F 40/284 |
| 2023/0134796 A1* | 5/2023 | Bhatnagar | G06N 20/20 704/9 |

* cited by examiner

*Primary Examiner* — Leonard Saint-Cyr
(74) *Attorney, Agent, or Firm* — Lindauer Law, PLLC

(57) ABSTRACT

A machine learning model analyzes text describing an item to determine portions of the text that correspond to multiple characteristics of the item. A first set of embeddings that represent the text describing the item is determined. A second set of embeddings that represent text indicating the characteristics is determined. The second set of embeddings includes a token for each characteristic that is used to indicate tokens that are associated with a particular characteristic. The first set of embeddings and portions of the second set of embeddings for a particular characteristic are used to determine a set of interaction embeddings for each characteristic by determining an element-wise product. These interaction embeddings are analyzed to determine label predictions indicating text that is associated with each characteristic. Text for multiple characteristics may therefore be identified using a single pass rather than multiple passes.

20 Claims, 6 Drawing Sheets

SYSTEMS FOR MULTIPLE NAMED ENTITY RECOGNITION

BACKGROUND

Named Entity Recognition (NER) processes analyze text to determine portions of the text related to specific characteristics. This process is typically performed using sequence labeling operations, or in some cases using machine learning models, to match a portion of the text with a single characteristic. The process is repeated for each desired characteristic, such as by passing the same text through a machine learning system multiple times. Performing multiple passes in this manner may consume significant time and computational resources during training and during analysis of the text.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
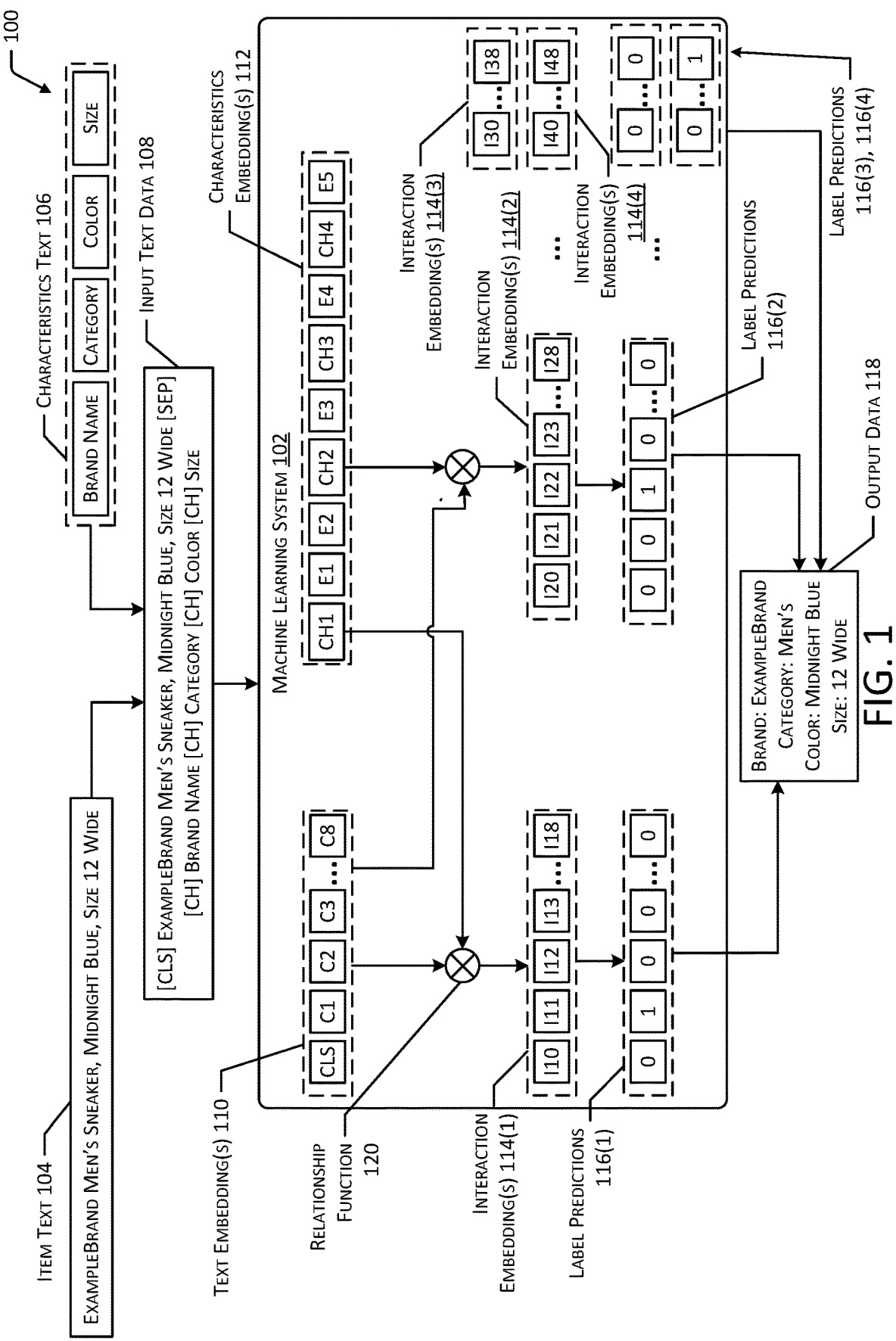
FIG. 1 is a diagram depicting an implementation of a process for using a machine learning system to determine multiple characteristics of an item based on text describing the item.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Computing devices may be used to analyze text and extract information from the text that corresponds to selected characteristics. This process is sometimes referred to as Named Entity Recognition (NER). For example, unstructured text may describe an item available for purchase using an online store. Certain portions of the text may indicate the brand of the item, an item category, a color of the item, a size of the item, and other characteristics of the item. An NER process may be performed to determine the specific portions of the text that indicate each desired characteristic. An NER process may be performed as a sequence labeling task, which may determine portions of the text that are associated with multiple characteristics. In other cases, an NER process may be performed using one or more machine learning models to determine a portion of the text that is likely to be associated with a selected single characteristic. To determine portions of the text associated with multiple characteristics, multiple passes associated with a machine learning model may be used. Based on the output determined using NER processes, data regarding an item may be stored or categorized based on various characteristics, associated with data or metadata indicating the determined characteristics of the item, and so forth.

Performance of existing NER processes to determine portions of text that correspond to multiple characteristics may consume significant time and computational resources. For example, each process to analyze the text and determine a portion of the text associated with a single characteristic may involve passing the text through a machine learning model. When determining text that corresponds to multiple characteristics, the same text may be passed through the machine learning system multiple times (e.g., one pass for each characteristic). The time and resources utilized by such a process may result in a system that is not readily scalable to accommodate a large number of characteristics. For example, in cases where significant quantities of information are analyzed, such as a catalog that includes text describing a large number of items available using an online store, determining a large number of characteristics for each item using NER processes may represent a significant investment of time and resources.

Described in this disclosure are techniques for analyzing text using a machine learning model, and extracting information regarding multiple characteristics in a single pass, resulting in faster performance of operations, use of smaller amounts of computational resources, and more efficient training of machine learning models. When text describing items available using an online store is analyzed, the characteristics to be extracted from the text for each item may be similar across multiple items. For example, when analyzing text describing clothing items, it may be desirable to determine portions of the text for multiple items that indicate an item brand, category, color, size, and so forth. Rather than analyzing the text describing an item multiple times, such as by passing the text through a machine learning model once for each characteristic, the characteristics to be determined may be combined into a single input that is provided to the machine learning model. The text describing the item may also be provided as an input to the machine learning model. In some implementations, the machine leaning model may include a Bidirectional Encoder Representations from Transformers (BERT) model, a Multilingual Bert (M-BERT) model, or other types of language representation models.

The machine learning model may be used to determine a first set of output embeddings based on the text describing the item. The embeddings may be indicative of words, characters, positions, segments, and so forth associated with various tokens in the text. The machine learning model may also be used to determine a second set of output embeddings based on the input text that indicates each of the characteristics. In some implementations, the input text may include a characteristic token associated with each characteristic. The characteristic token may include a random value, an arbitrary value, another type of known value, or any type of data that may be identified by the machine learning model, and may therefore be used to indicate different characteristics included within the input text. For example, a first characteristic token may precede one or more tokens associated with a first characteristic, which may be followed by a second characteristic token that precedes one or more tokens associated with a second characteristic. The machine learning model may be trained to identify the tokens associated with different characteristics based on the characteristic tokens included in the input text. Therefore, the machine learning model may determine particular portions of the second set of output embeddings that correspond to each characteristic.

Each portion of the second set of output embeddings that is associated with a characteristic may be used in combination with the first set of output embeddings (that represent the text describing the item) to determine a set of interaction embeddings for the particular characteristic. For example, an element-wise product may be determined based on the portion of the second set of output embeddings associated with a characteristic and based on the first set of output embeddings. In other implementations, another function, such as a layer product, may be used to determine interaction embeddings. A set of interaction embeddings may be determined for each characteristic identified in the second set of output embeddings. The interaction embeddings may therefore function as entity-specific representations for each token included in the text describing the item. The interaction embeddings may be used to generate label predictions for each characteristic, each label prediction being associated with one or more embeddings that represent a portion of the text describing the item. Therefore, labels indicating multiple characteristics may be determined by performing a single pass of the text describing the item using a machine learning model, rather than performing multiple passes with each pass extracting a single characteristic. As a result, text may be analyzed more efficiently and using a smaller quantity of computational resources. Additionally, machine learning models may be trained more quickly using this process. For example, based on the determined interaction embeddings and label predictions, a cross-entropy loss function may be determined. The machine learning model(s) may be trained to minimize the value of the loss function.

FIG. 1 is a diagram 100 depicting an implementation of a process for using a machine learning system 102 to determine multiple characteristics of an item based on text describing the item. While FIG. 1 describes an implementation in which text describing an item is analyzed to determine characteristics of the item presented in the text, in other implementations, other types of text may be processed using similar techniques.

In some cases, text describing an item may include unstructured text which may include alphanumeric characters such as uppercase letters, lowercase letters, numerals, punctuation, spacing and formatting characteristics, and so forth. The machine learning system 102 may be trained to process the item text 104 to determine portions of the item text 104 that are associated with particular characteristics. For example, FIG. 1 depicts item text 104 that describes a clothing item as "ExampleBrand Men's Sneaker, Midnight Blue, Size 12 Wide". Continuing the example, certain portions of the item text 104 may indicate characteristics of the associated item, such as a brand name of "ExampleBrand", a color of "Midnight Blue", a category of "Men's", and a size of "12 Wide". In some cases, a single word of the item text 104 may correspond to a characteristic of the item, such as the brand name "ExampleBrand". In other cases, multiple words of the item text 104 may correspond to a characteristic of the item, such as the color "Midnight Blue". In still other cases, different portions of the item text 104 may correspond to the same characteristic of the item. For example, text such as "ExampleBrand Men's Blue Sneaker, Midnight Blue, Size 12 Wide" may include more than one portion having text corresponding to the color of the item (e.g., "Blue" and "Midnight Blue"). Additionally, in some cases, one or more portions of the item text 104 may not be associated with a characteristic that is to be determined using the machine learning system 102. For example, the word "Sneaker" may not correspond to a category to be determined using the machine learning system 102. Furthermore, in some cases, one or more characteristics that are to be determined using the machine learning system 102 may not be present in the item text 104. For example, the machine learning system 102 may be configured to determine a characteristic relating to the material from which the item is constructed, and the item text 104 may lack words that indicate this information.

The machine learning system 102 may also access characteristics text 106 indicating one or more characteristics to be determined using the machine learning system 102. The machine learning system 102 may be trained to determine relationships between the characteristics text 106 and the item text 104 that represent portions of the item text 104 associated with the characteristics indicated in the characteristics text 106. For example, the machine learning system 102 may include a BERT machine learning model, an M-BERT machine learning model, or other type of system that is configured to parse language, such as by determining language tokens, embeddings, and so forth, and determine probabilities of relationships based on values indicated in the determined embeddings. FIG. 1 depicts example characteristics text 106 indicative of four categories: "Brand Name", "Category", "Color", and "Size", however any number and any type of characteristics may be determined.

Input text data 108 may be determined based on the item text 104 and the characteristics text 106. In some cases, the input text data 108 may be determined by the machine learning system 102 or generated by one or more computing devices based on the item text 104 and the characteristics text 106. In other implementations, the text input data 108 may be input directly to the machine learning system 102, such as through user input, or by storing the input text data 108 in data storage accessible to the machine learning system 102. The input text data 108 may include the item text 104 and the characteristics text 106, as well as one or more additional tokens that may be processed by the machine learning system 102. The tokens may include text, numerals, or any other type of value or data that may be identified by the machine learning system 102. For example, the tokens included in the input text data 108 may include arbitrary values, random values, known values, values that have been selected by a user or automated system, values selected by the machine learning system 102, and so forth. FIG. 1 depicts example input text data 108 that includes an initial token "[CLS]" that indicates the input text data 108 and a separator token "[September]" that indicates a separation between portions of the input text data 108 that include the item text 104 and portions of the input text data 108 that include the characteristics text 106. The format of the initial token and separator token may be determined based on the type of machine learning system 102 that is used. In other implementations, one or more of the initial token or the separator token may be omitted. FIG. 1 also depicts the input text data 108 including multiple characteristic tokens "[CH]" that indicate text associated with specific characteristics. For example, a characteristic token may precede one or more words of the characteristics text 106 associated with a single characteristic, enabling the machine learning system 102 to determine that the words that follow the characteristic token are associated with a particular characteristic. In other cases, a characteristic token may follow one or more words associated with a particular characteristic, or may otherwise indicate portions of the input text data 108.

The machine learning system 102 may process the input text data 108 to determine text embeddings 110 that represent portions of the input text data 108 associated with the item text 104, and characteristics embeddings 112 that represent portions of the input text data 108 associated with the characteristics text 106. For example, the machine learning system 102 may be trained to identify a separator token that separates the portions of the input text data 108 associated with the item text 104 from those associated with the characteristics text 106 and may generate separate sets of embeddings for each portion of the input text data 108.

As shown in FIG. 1, the text embeddings 110 may include an embedding representing the initial token (labeled "[CLS]"), as well as embeddings representing the portions of the input text data 108 that correspond to the item text 104. For example, an embedding of the text embedding(s) 110 may represent a particular word of the input text data 108, or in other cases a partial word. Each text embedding 110 may include values associated with the word or partial word represented by the text embedding 110, the characters included in the text embedding 110, the position of a word or character relative to other words or characters, and a segment of the input text data 108 associated with the text embedding 110. For example, portions of the input data 108 that correspond to the item text 104 may be associated with a first segment value represented in the text embeddings 110, while portions of the input text data 108 that correspond to the characteristics text 106 may be associated with a second segment value represented in the characteristics embeddings 112.

The characteristics embeddings 112 may include embeddings representing the characteristic tokens (labeled "[CH]"), as well as embeddings representing the portions of the input text data 108 that correspond to the characteristics text 106. For example, an embedding of the characteristics embedding(s) 112 may represent a particular word of the characteristics text 106. Continuing the example, an embedding representing a first characteristic token "[CH1]" may be followed by characteristics embeddings 112 that represent words associated with a particular characteristic, such as the words "Brand" and Name". Similarly, a second characteristic token "[CH2]" may be followed by a characteristics embedding 112 representing a word associated with a second characteristic, such as the word "Category", a third characteristic token "[CH3]" may be followed by a characteristics embedding 112 representing a word associated with a third characteristic, such as the word "Color", and a fourth characteristic token "[CH4]" may be followed by a characteristics embedding 112 representing a word associated with a fourth characteristic, such as the word "Size". Each characteristics embedding 112 may include values associated with the word or partial word represented by the characteristics embedding 112, the characters included in the characteristics embedding 112, the position of a word or character relative to other words or characters, and a segment of the input text data 108 associated with the characteristics embedding 112.

Based on the text embeddings 110 and the characteristics embeddings 112, the machine learning system 102 may determine sets of interaction embeddings 114 that represent portions of text embeddings 110 specific to a particular subset of characteristics embeddings 112. In some implementations, a set of interaction embeddings 114 may be determined by performing a relationship function 120 based on the text embeddings 110 and characteristics embeddings 112. For example, the interaction embeddings 114 may be determined based on an element-wise product of the text embeddings 110 and a subset of characteristics embeddings 112 associated with a particular characteristic token. As another example, the interaction embeddings 114 may be determined based on a layer product. In some implementations, an element-wise product may be determined based on Equation 1 below:

$$P_i = T * ENT_i \quad \text{(Equation 1)}$$

In Equation 1, Pi represents the Ith entity-specific context vector of a shape (n, dim). T is the context vector of the shape (n, dim), where n is the context length. ENTi is the entity vector of the shape (dim) for the Ith entity.

In some implementations, a layer product may be determined based on Equation 2 below:

$$P_i = W1(T) * W2(ENT_i) \quad \text{(Equation 2)}$$

In Equation 2, Pi represents the Ith entity-specific context vector of a shape (n, dim). T is the context vector of the shape (n, dim), where n is the context length. ENTi is the entity vector of the shape (dim) for the Ith entity. W1 and W2 represent linear weight matrices.

The machine learning system 102 may determine a portion of the characteristics embeddings 112 based on a characteristic token included in the input text data 108. Continuing the example, a characteristics embedding 112 associated with the characteristic token "[CH1]" may be used to determine other characteristics embeddings 112 "E1" and "E2" that are associated with a particular characteristic indicated in the input text data 108. The machine learning system 102 may determine an element-wise product, layer product, or other function based on this subset of the characteristics embeddings 112 and the text embeddings 110 to determine a first set of interaction embeddings 114(1) specific to a first characteristic. Similarly, a second portion of the characteristics embeddings 112 and the text embeddings 110 may be used to determine a second set of interaction embeddings 114(2), a third portion the characteristics embeddings 112 and the text embeddings 110 may be used to determine a third set of interaction embeddings 114(3), a fourth portion the characteristics embeddings 112 and the text embeddings 110 may be used to determine a fourth set of interaction embeddings 114(4), and any number of additional subsets of characteristics embeddings 112 may similarly be used to determine corresponding additional sets of interaction embeddings 114.

The machine learning system 102 may be configured to determine one or more sets of label predictions 116 based on the interaction embeddings 114. For example, a set of label predictions 116 for a particular set of interaction embeddings 114 may indicate a probability that a particular embedding within the set of interaction embeddings 114 is associated with the characteristics embeddings 112 from which the interaction embeddings 114 were generated. Continuing the example, the machine learning system 102 may be trained to determine the probability that one or more values associated with a particular interaction embedding 114 are related to a particular characteristic represented by a characteristics embedding 112. In some cases, a label prediction 116 may indicate a single embedding that is likely to correspond to a characteristic. In other cases, a label prediction 116 may indicate multiple embeddings, such as when multiple words within the item text 104 are related to a particular characteristic. In some cases, multiple portions of item text 104 may be related to a characteristic. For example, item text 104 may include multiple brand names or may include a single brand name at more than one location within the text. As such, while FIG. 1 depicts label predictions 116 illustrative of a case in which each characteristic is referenced once within the item text 104, in other implementations, a set of label predictions 116 may indicate the presence of text that corresponds to a characteristic at multiple locations within the item text 104. Specifically, FIG. 1 depicts a first set of label predictions 116(1) determined based on the first interaction embeddings 114(1), which indicate a particular interaction embedding 114(1) associated with a probability of being related to a first characteristic. For example, an embedding representing the item text 104 "ExampleBrand" may correspond to the characteristics text 106 of "Brand Name". Similarly, a second set of label predictions 116(2) may be determined based on the second interaction embeddings 114(2), which indicate a particular interaction embedding 114(2) with a probability of being related to a different characteristic. For example, an embedding representing the item text 104 "Men's" may correspond to the characteristics text 106 of "Category". In a similar manner, label predictions 116(3), 116(4) may be determined for other sets of interaction embeddings 114.

Output data 118 may be determined based on at least a subset of the label predictions 116. For example, output data 118 may include text that is presented or stored for presentation. As another example, output data 118 may include data or metadata that is stored in association with item data, such as to cause item data to be stored based on particular characteristics, retrieved based on queries that indicate particular characteristics, and so forth. In some implementations, a loss function, such as a cross-entropy loss function or another type of loss function, may be determined based on one or more label predictions 116 and expected values for the label prediction(s) 116, or in some cases based on one or more interaction embeddings 114 and expected values for the interaction embedding(s) 114. For example, by minimizing a loss function, accuracy of the machine learning system 102 may be improved for future embeddings and predictions.

Figure 2A:
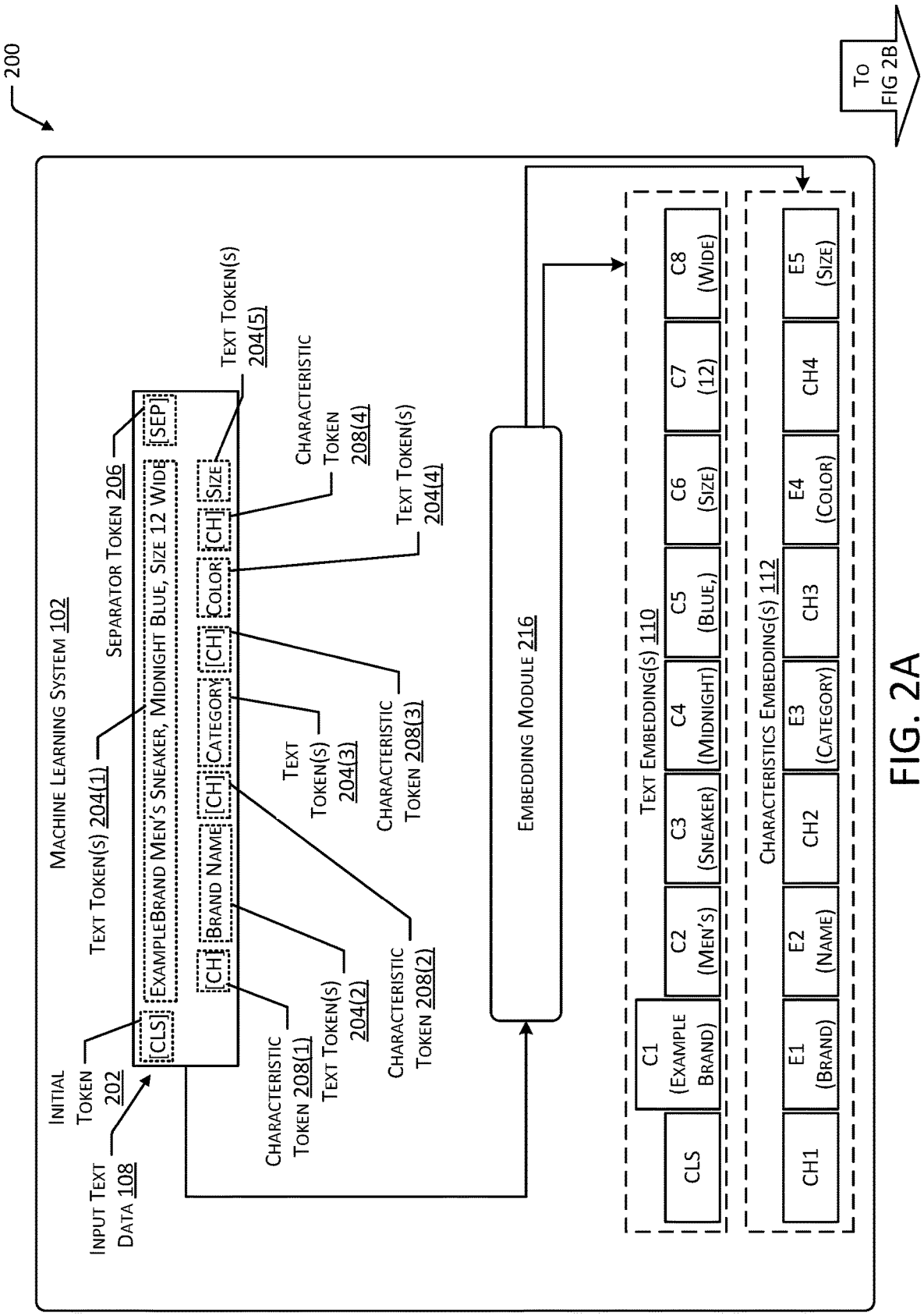
FIGS. 2A-2C are diagrams depicting performance of a process using a machine learning system to determine characteristics of an item based on input text data.
Figure 2B:
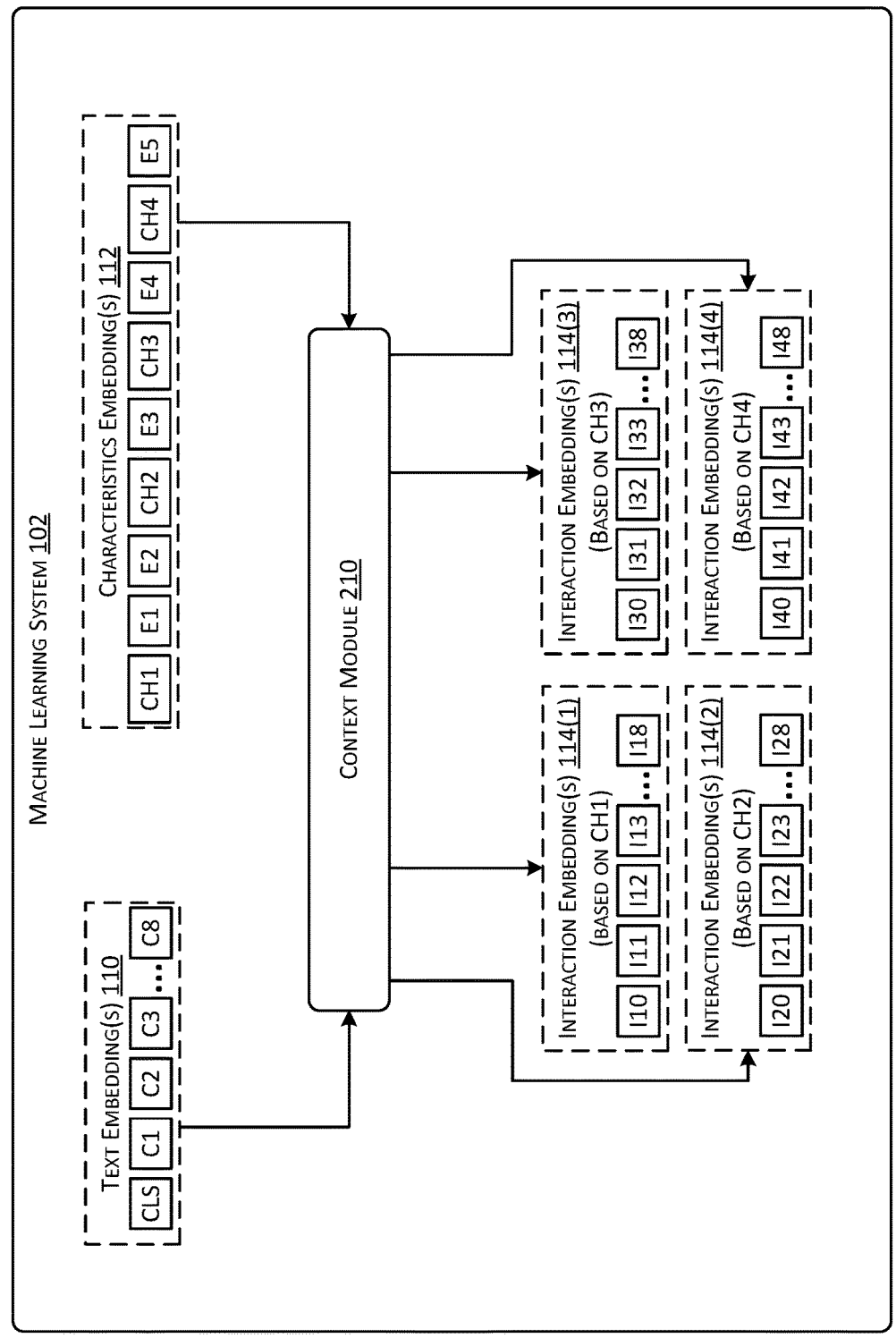
Figure 2C:
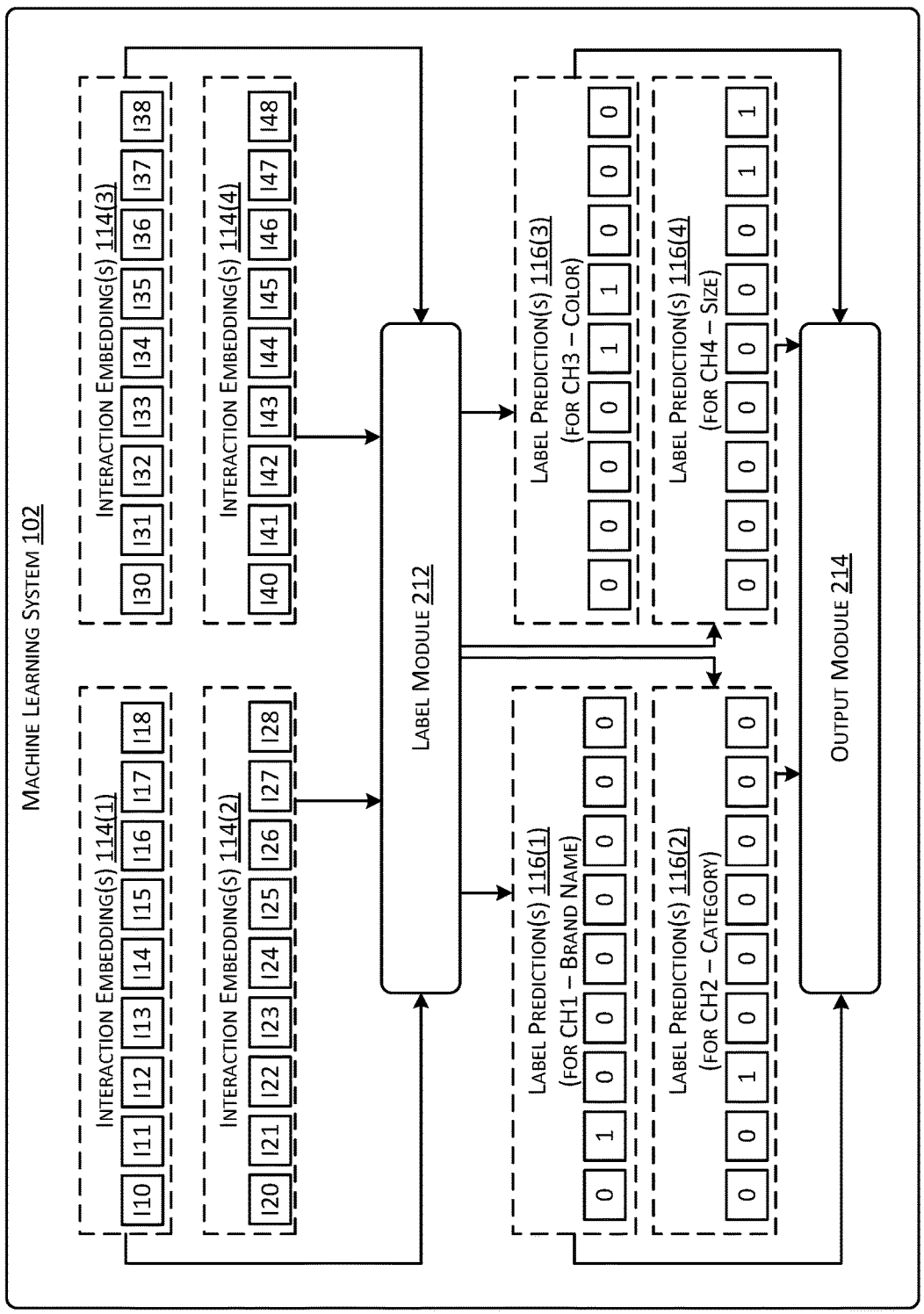

FIGS. 2A-2C are diagrams 200 depicting performance of a process using a machine learning system 102 to determine characteristics of an item based on input text data 108. As described with regard to FIG. 1, input text data 108 that is used as an input for the machine learning system 102 may be determined based on item text 104 that includes text describing an item and characteristics text 106 that includes text indicating one or more characteristics of items to be determined using the machine learning system 102. In addition to including tokens that represent the text included in the input text data 108, the input text data 108 may include one or more functional tokens, such as tokens indicating the beginning of the input text data 108, tokens separating the portion(s) of the input text data 108 associated with the item text 104 from those associated with the characteristics text 106, and tokens that indicate portions of the input text data 108 that represent particular characteristics. In some implementations, the machine learning system 102 or another system or computing device may determine input embeddings based on the input text data 108. For example, embeddings representing the input text data 108 may include data indicative of words, characters, positions, segments, and so forth associated with various tokens in the input text data 108.

FIG. 2A depicts the input text data 108 including an initial token 202 that indicates the beginning of the input text data 108. The initial token 202 may be identified by the machine learning system 102 and may cause the machine learning system 102 to process the input text data 108 to determine relationships between text tokens 204 that are separated by a separator token 206 included in the input text data 108. For example, a first set of text tokens 204(1) that represent text included in the item text 104 may follow the initial token 202. In other implementations, use of an initial token 202 may be omitted. A separator token 206 may follow the first set of text tokens 204(1) and may indicate a separation between the first set of text tokens 204(1) determined based on the item text 104 and other text tokens 204 determined based on the characteristics text 106.

In some implementations, the initial token 202 may also serve as a null token that may be indicated if the item text 104 does not include text that corresponds to one or more characteristics indicated in the characteristics text 106. For example, if the machine learning system 102 does not determine that any embeddings that represent the first set of text tokens 204(1) include text that corresponds to the characteristics represented by the other sets of text tokens 204, label predictions 116 based on those embeddings may indicate the location of the initial token 202 as having a probability of being associated with a characteristic, while other embeddings may be determined to have a lower probability of such an association. In other implementations, a classifier or other type of module may be configured to determine the presence or absence of text that corresponds to a characteristic within the text embeddings 110 or input text data 108, and output from the module indicating the absence of text that corresponds to a characteristic may cause label predictions 116 associated with that characteristic to be disregarded. As described with regard to FIG. 1, the machine learning system 102 may determine text embeddings 110 based on the portion(s) of the input text data 108 that include the text token(s) 204(1) that represent the item text 104. For example, an embedding module 216 associated with the machine learning system 102 may determine text embeddings 110 for text tokens 204(1) in the input text data 108 based on the words, partial words, characters, positions, and segments associated with each text token 204(1). The text embeddings 110 may include an embedding associated with the initial token 202, which may enable the initial token 202 to be indicated in a label prediction 116 in cases where the text embeddings 110 do not represent text associated with a particular category.

As shown in FIG. 2A, one or more sets of text tokens 204 that represent the characteristics text 106, and one or more characteristic tokens 208, may follow the separator token 206 in the input text data 108. In other implementations, portions of the input text data 108 that represent the characteristics text 106 may precede portions that represent the item text 104. In still other implementations, the machine learning system 102 may be trained to identify separator tokens 206 or other tokens that denote whether a text token 204 is associated with item text 104 or characteristics text 106, or the machine learning system 102 may be trained to determine segment data for embeddings that represent the text tokens 204. In such a case, the text tokens 204 associated with item text 104 or characteristics text 106 may be included in the input text data 108 with any order or arrangement.

A first characteristic token 208(1) is shown preceding a set of text tokens 204(2) that represent a first characteristic (e.g., "Brand Name"). A second characteristic token 208(2) is shown preceding a set of text tokens 204(3) that represent a second characteristic (e.g., "Category"). A third characteristic token 208(3) is shown preceding a set of text tokens 204(4) that represent a third category (e.g., "Color"). A fourth characteristic token 208(4) is shown preceding a set of text tokens 204(5) that represent a fourth category (e.g., "Size"). The characteristic tokens 208 may include one or more random values, arbitrary values, other types of known values, or any other type of data that may be identified by the machine learning system 102. Therefore, the characteristic tokens 208 may enable the machine learning system 102 to determine particular text tokens 204 that correspond to particular characteristics indicated in the characteristics text 106. For example, the embedding module 216 may determine characteristics embeddings 112 based on portions of the input text data 108 associated with the characteristics text 106, such as portions that follow the separator token 206. The characteristics embedding(s) 112 may include embeddings associated with the characteristic tokens 208, which may indicate that other embeddings that precede or follow the embeddings based on the characteristic tokens 208 may be associated with a particular characteristic indicated in the text that followed or preceded the characteristic token 208.

As shown in FIG. 2B and described with regard to FIG. 1, the text embedding(s) 110 and one or more portions of the characteristics embedding(s) 112 may be used to determine one or more sets of interaction embeddings 114 that are based on particular portions of the characteristics embedding(s) 112 that represent particular characteristics. In some implementations, a set of interaction embeddings 114 may be determined based on an element-wise product or layer product of the text embeddings 110 and a subset of characteristics embeddings 112 associated with a particular characteristic token 208. For example, based on the text embeddings 110 and a first portion of the characteristics embeddings 112 associated with a first characteristic token 208(1) ("CH1", followed by the embeddings "E1" and "E2"), a context module 210 associated with the machine learning system 102 may determine a first set of interaction embeddings 114(1). Based on the text embeddings 110 and a second portion of the characteristics embeddings 112 associated with a second characteristic token 208(2) ("CH2", followed by the embedding "E3"), the context module 210 may determine a second set of interaction embeddings 114(2). Based on the text embeddings 110 and a third portion of the characteristics embeddings 112 associated with a third characteristic token 208(3) ("CH3", followed by the embedding "E4"), the context module 210 may determine a third set of interaction embeddings 114(3). Based on the text embeddings 110 and a fourth portion of the characteristics embeddings 112 associated with a fourth characteristic token 208(4) ("CH4", followed by the embedding "E5"), the context module 210 may determine a fourth set of interaction embeddings 114(4).

As shown in FIG. 2C and described with regard to FIG. 1, the interaction embeddings 114 for each characteristic may be used to determine a corresponding set of label predictions 116. A set of label predictions 116 may indicate a probability that a particular embedding, or multiple embeddings, within a set of interaction embeddings 114, is associated with the characteristics embeddings 112 from which the interaction embeddings 114 were generated. For example, the machine learning system 102 may be trained to determine the probability that one or more values associated with a particular interaction embedding 114 are related to a particular characteristic represented by a characteristics embedding 112.

As shown in FIG. 2C, a label module 212 associated with the machine learning system 102 may determine a first set of label predictions 116(1) based on the first set of interaction embeddings 114(1). The first set of label predictions 116(1) may indicate that a particular embedding has a probability of being associated with the characteristic indicated in the portion of the characteristics embeddings 112 associated with the first characteristic token 208(1). For example, the interaction embedding 114(1) representing the item text 104 of "ExampleBrand" may correspond to the portion of the characteristics embeddings 112 that represent the characteristics text 106 "Brand Name".

The label module 212 may determine a second set of label predictions 116(2) based on the second interaction embeddings 114(2). The second set of label predictions 116(2) may indicate that a particular embedding has a probability of being associated with the characteristic indicated in the portion of the characteristics embeddings 112 associated with the second characteristic token 208(2). For example, the interaction embedding 114(2) representing the item text 104 of "Men's" may correspond to the portion of the characteristics embeddings 112 that represent the characteristics text 106 "Category".

The label module 212 may determine a third set of label predictions 116(3) based on the third interaction embeddings 114(3). The third set of label predictions 116(3) may indicate that multiple embeddings have a probability of being associated with the characteristic indicated in the portion of the characteristics embeddings 112 associated with the third characteristic token 208(3). For example, the interaction embeddings 114(3) representing the item text 104 of "Midnight Blue" may correspond to the portion of the characteristics embeddings 112 that represent the characteristics text 106 "Color".

The label module 212 may determine a fourth set of label predictions 116(4) based on the fourth interaction embeddings 114(4). The fourth set of label predictions 116(4) may indicate that multiple embeddings have a probability of being associated with the characteristic indicated in the portion of the characteristics embeddings 112 associated with the fourth characteristic token 208(4). For example, the interaction embeddings 114(4) representing the item text 104 of "12 Wide" may correspond to the portion of the characteristics embeddings 112 that represent the characteristics text 106 "Size".

While each set of label predictions 116 shown in FIG. 1 depicts predictions in which a single embedding or two adjacent embeddings have a probability of being associated with a characteristic, any number of adjacent or non-adjacent embeddings may have a probability of being associated with a characteristic. For example, the item text 104 "ExampleBrand Men's Blue Sneaker, Midnight Blue, Size 12 Wide" may result in a set of label predictions 116 in which text representing a possible color of the item is present at two locations within the text.

An output module 214 associated with the machine learning system 102 may determine output data 118 based on at least a portion of the label predictions 116. In some implementations, output data 118 may include text, audio data, or another type of data that may be presented or stored for presentation. In other cases, output data 118 may be stored in association with item data or used to modify item data associated with an item, such as to cause the item data to be associated with particular characteristics, able to be retrieved based on queries that indicate particular characteristics, and so forth. By performing the process described with regard to FIG. 1 and FIGS. 2A-2C, label predictions 116 and output data 118 may be determined based on input text data 108 using a single pass associated with a machine learning system 102. For example, the machine learning system 102 may determine item text 104 associated with multiple characteristics in a single pass, rather than using one pass for each characteristic to be determined.

Figure 3:
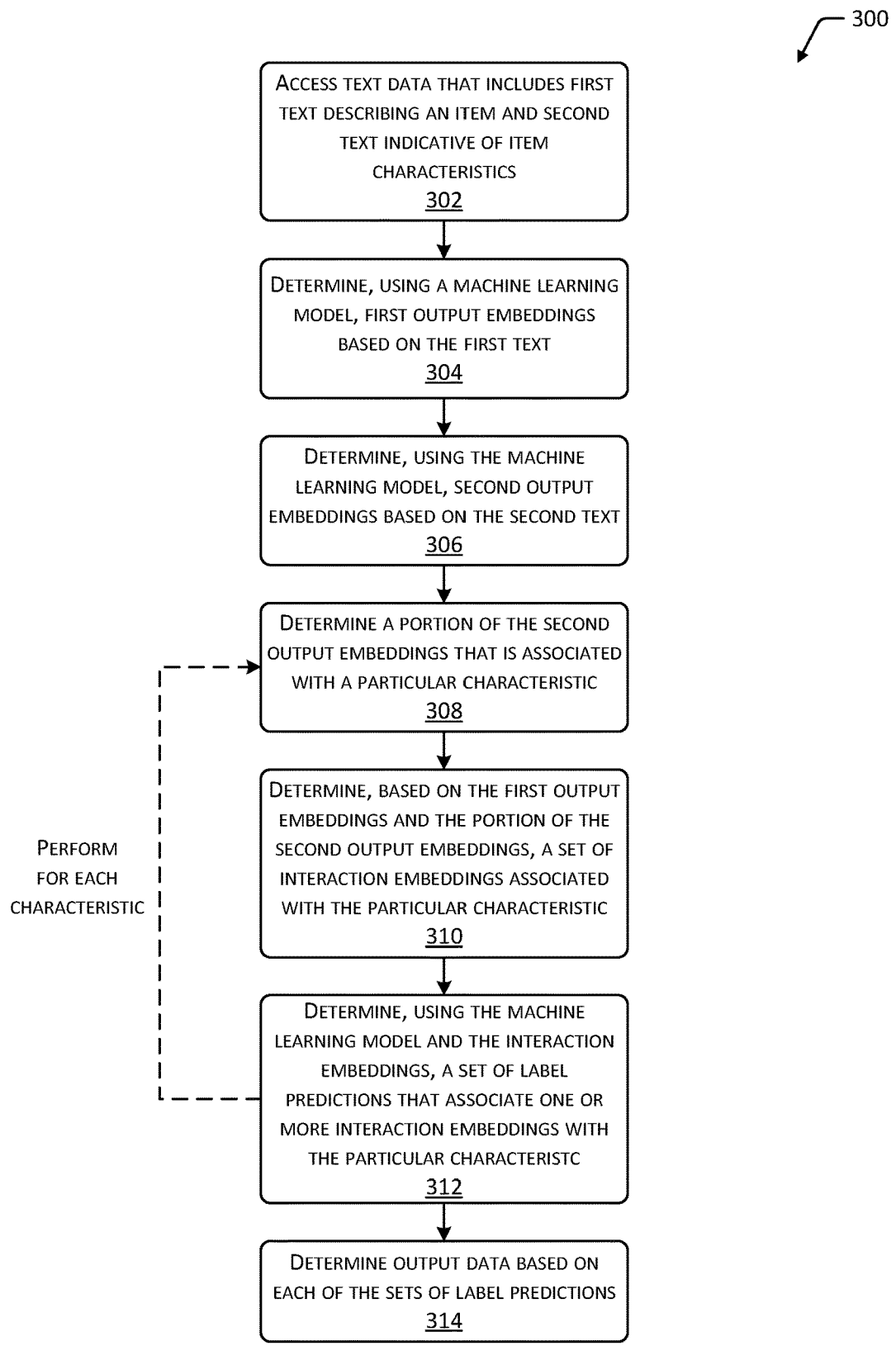
FIG. 3 is a flow diagram depicting an implementation of a method for using a single pass associated with a machine learning system to determine portions of text describing an item that are associated with particular characteristics of the item.

FIG. 3 is a flow diagram 300 depicting an implementation of a method for using a single pass associated with a machine learning system 102 to determine portions of text describing an item that are associated with particular characteristics of the item. At 302, text data that includes first text describing an item and second text indicative of item characteristics may be accessed. For example, input text data 108 may be determined based on item text 104 that describes an item, and characteristics text 106 that indicates one or more characteristics of items. The input text data 108 may therefore include first text based on the item text 104, and second text based on the characteristics text 106. As descried previously with regard to FIGS. 1 and 2A-2C, input text data 108 may include text tokens 204 based on at least a portion of the item text 104 and characteristics text 106, as well as other tokens, such as an initial token 202, separator token 206, and one or more characteristic tokens 208. For example, the separator token 206 may be used to determine portions of the input text data 108 associated with the item text 104 and portions associated with the characteristics text 106. The characteristic tokens 208 may be used to determine particular portions of the second text that are associated with particular characteristics.

At 304, a machine learning model may be used to determine first output embeddings based on the first text. For example, as described with regard to FIG. 1, a machine learning system 102, such as a BERT or M-BERT system, may determine one or more text embeddings 110 based on a portion of input text data 108 that is associated with item text 104. The portion of the input text data 108 associated with the item text 104 may be determined based at least in part on a separator token 206. For example, portions of the input text data 108 that precede the separator token 206 may be associated with the item text 104, while portions that follow the separator token 206 may be associated with the characteristics text 106. In other implementations, portions of the input text data 108 associated with the item text 104 may follow the separator token 206 rather than precede the separator token 206. A text embedding 110 may include one or more values associated with the word represented by the text embedding 110, the character(s) included in the text embedding 110, the position of a word or character relative to other words or characters, and a segment of the input text data 108 associated with the text embedding 110. In some cases, the text embeddings 110 may also include an embedding associated with an initial token 202 included in the input text data 108. For example, the initial token 202 may be indicated in a label prediction 116 if the machine learning system 102 determines that other text embeddings 110 are not associated with a particular characteristic.

At 306, the machine learning model may be used to determine second output embeddings based on the second text. As described with regard to FIG. 1, a machine learning system 102 may determine one or more characteristics embeddings 112 based on a portion of the input text data 108 that is associated with characteristics text 106. The portion of the input text data 108 associated with the item text 104 may be determined based at least in part on a separator token 206 included in the input text data 208. A characteristics embedding 112 may include one or more values associated with the word represented by the characteristics embedding 112, the character(s) included in the characteristics embedding 112, the position of a word or character relative to other words or characters, and a segment of the input text data 108 associated with the characteristics embedding 112. The characteristics embeddings 112 may include embeddings that represent the characteristic tokens 208 included in the input text data 108. For example, an embedding determined for a characteristic token 208 may be associated with embeddings associated with text that describes a particular characteristic. Continuing the example, text that follows or precedes a first characteristic token 208 may be associated with a first characteristic, while text that follows or precedes a second characteristic token 208 may be associated with a second characteristic. The machine learning system 102 may be trained to determine text tokens 204 associated with different characteristics based on the characteristic tokens 208 included in the input text data 108. While FIG. 3 depicts block 304 prior to block 306, these steps may be performed in any order. For example, the first output embeddings representing the first text may be determined before determining the second output embeddings, after determining the second output embeddings, or at least partially concurrently with determination of the second output embeddings.

At 308, a portion of the second output embeddings that is associated with a particular characteristic may be determined. For example, a characteristics embedding 112 may be determined based on a characteristic token 208, and a portion of the characteristics embeddings 112 may be determined based on the text tokens 204 that are associated with the characteristic token 208. Therefore, based on the characteristic tokens 208 included in the input text data 108, the machine learning system 102 may determine particular characteristics embeddings 112 that are associated with a characteristic.

At 310, based on the first output embeddings and the portion of the second output embeddings determined at 308, a set of interaction embeddings 114 associated with the particular characteristic may be determined. In some implementations, a set of interaction embeddings 114 may be determined based on a product of the text embeddings 110 and a subset of characteristics embeddings 112 associated with a particular characteristic token 208, such as an element-wise product or layer product.

At 312, the machine learning model and the interaction embeddings 114 determined at 310 may be used to determine a set of label predictions 116 that associate one or more of the interaction embeddings 114 with the particular characteristic. As described with regard to FIGS. 1 and 2A-2C, the machine learning system 102 may be trained to determine label predictions 116 based on values indicated in the interaction embeddings 114. For example, a set of label predictions 116 for a particular set of interaction embeddings 114 may indicate probabilities that particular embeddings within the set of interaction embeddings 114 are associated with the characteristics embeddings 112 from which the interaction embeddings 114 were determined. In some cases, a label prediction 116 may indicate a single embedding that has a probability to correspond to a characteristic. In other cases, a label prediction 116 may indicate multiple embeddings, such as when multiple words within item text 104 are related to a particular characteristic.

The process described in steps 308, 310, and 312 may be repeated multiple times, sequentially or concurrently, to determine portions of the characteristics embeddings 112 associated with a particular characteristic, determine interaction embeddings 114 based on the text embeddings 110 and that portion of the characteristics embeddings 112, and determine label predictions 116 based on the interaction embeddings 114. This process may therefore determine label predictions 116 for multiple characteristics indicated in the characteristics text 106 using a single pass of the machine learning system 102.

At 314, output data 118 may be determined based on each of the sets of label predictions 116. In some cases, output data 118 may include text, audio data, or another type of data that may be presented or stored for presentation. In other cases, output data 118 may be stored in association with item data or used to modify item data, such as to cause the item data to be associated with particular characteristics, able to be retrieved based on queries that indicate particular characteristics, and so forth.

Figure 4:
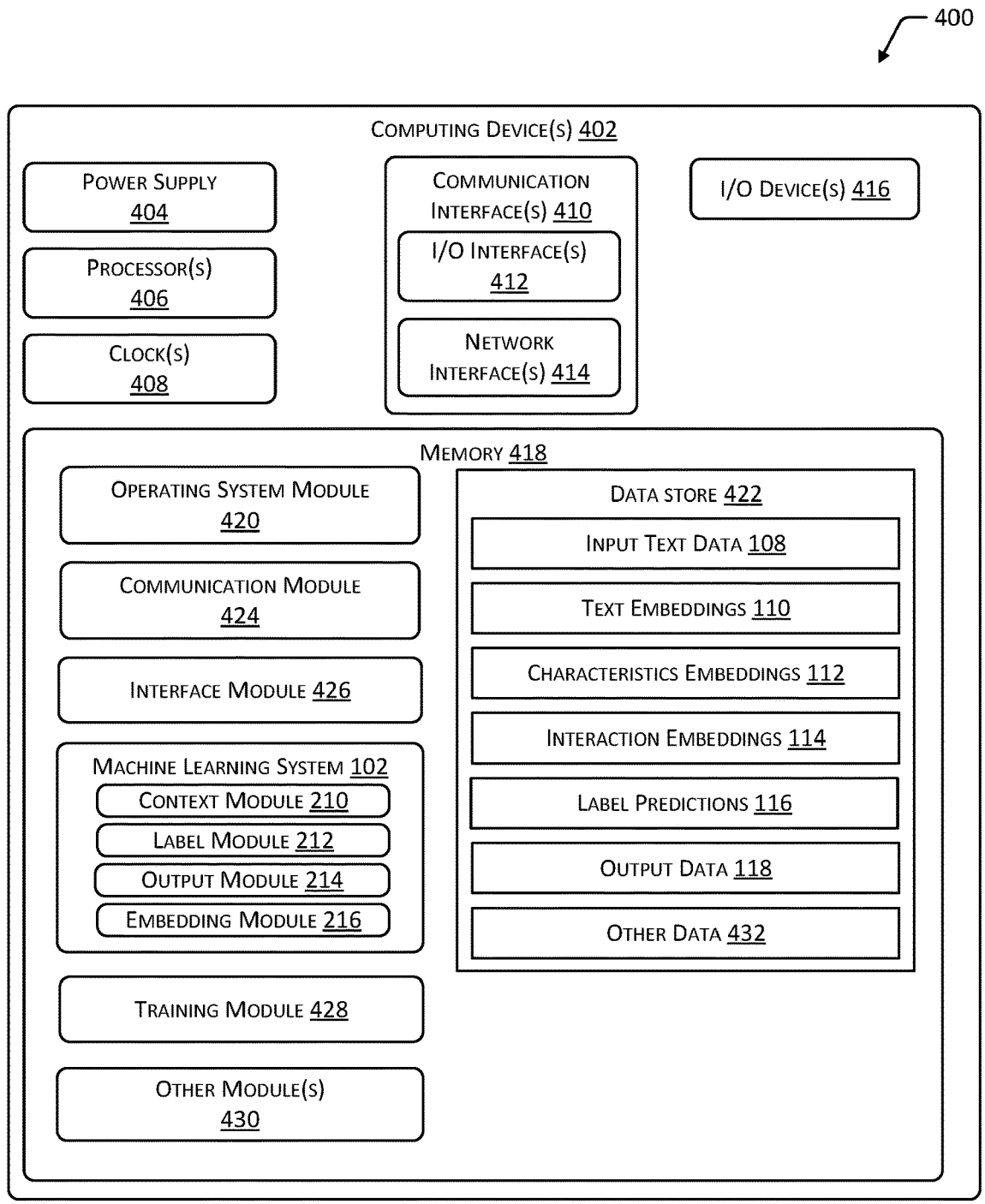
FIG. 4 is a block diagram illustrating an implementation of a computing device within the present disclosure.

FIG. 4 is a block diagram 400 illustrating an implementation of a computing device 402 within the present disclosure. In some implementations, the computing device 402 may store or execute one or more machine learning models that are part of a machine learning system 102. In other implementations, the computing device 402 may communicate with one or more other computing devices 402 thar are associated with a machine learning system 102. In still other implementations, the computing device 402 may access a machine learning system 102 and may receive instructions from one or more other computing devices 402 for use with the machine learning system 102. Additionally, while FIG. 4 depicts a single block diagram 400 of a computing device 402, any number and any type of computing devices 402 may be used to perform the functions described herein.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 4G, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may also store an interface module 426. An interface module 426 may receive input from one or more input devices or other computing devices 402, such as item text 104, characteristics text 106, or input text data 108 provided via user input, or input from a service, application, client, automated system, or other computing device 402. For example, the machine learning system 102 may determine input text data 108 based on other text, such as item text 104 or characteristics text 106 received from other sources. In other cases, the machine learning system 102 may receive input text data 108 as an input and may determine embeddings and label predictions 116 based on the received input text data 108. In other implementations, one or more embeddings, such as text embeddings 110 or characteristics embeddings 112 may be determined by one or more other computing devices 402, and the machine learning system 102 may receive these embeddings as inputs and may determine interaction embeddings 114 and label predictions 116 based on the received embeddings. The interface module 426 may also present output, such as output data 118 that may include text or audio data, using one or more interfaces. In other cases, output data 118 may be provided to other computing devices 402, or other portions of the computing device 402, such as for storage in association with item data, retrieval in response to queries, and so forth.

The memory 418 may additionally store the machine learning module 102. The machine learning module 102 may be trained to determine embeddings based on accessed text data, embeddings (such as interaction embeddings 114) based on other embeddings, label predictions 116 based on embeddings, and output data 118 based on label predictions 116. In other cases, output data 118 may be determined using other computing devices 402 or other portions of the computing device 402.

The memory 418 may store a training module 428, which may be used to receive, process, and generate training data for use with the machine learning system 102. In some implementations, the machine learning module 102 may be trained based in part on a loss function. For example, a cross-entropy loss function may be determined based on one or more interaction embeddings 114 or label predictions 116, and expected values for the interaction embedding(s) 114 or label prediction(s) 116. For example, by minimizing a loss function, accuracy of the machine learning system 102 may be improved for future embeddings and predictions. Training data may also enable the machine learning system 102 to identify and process functional tokens, such as initial tokens 202 indicative of input text data 108, separator tokens 206 that indicate portions of input text data 108 associated with item text 104 or characteristics text 106, and characteristic tokens 208 that may indicate particular text tokens 204 associated with particular characteristics.

Other modules 430 may also be present in the memory 418. For example, other modules 430 may include permission or authorization modules to enable users to access and modify data associated with the computing device 402. Other modules 430 may also include encryption modules to encrypt and decrypt communications between computing devices 402, authentication modules to authenticate communications sent or received by computing devices 402, and so forth.

Other data 432 within the data store(s) 422 may include configurations, settings, preferences, and default values associated with computing devices 402. Other data 432 may also include encryption keys and schema, access credentials, and so forth. Other data 432 may further include training data associated with the machine learning system 102, algorithms, functions, threshold data, and models used in association with the machine learning system 102, and so forth.

In different implementations, different computing devices 402 may have different capabilities or capacities. For example, servers that store or access machine learning systems 102 may have greater processing capabilities or data storage capacity than personal computing devices used to provide data to or receive data from such servers or other computing devices 402.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and one or more hardware processors to execute the computer-executable instructions to:
    access text data that includes first text describing an item and second text indicative of a plurality of item characteristics that include at least a first item characteristic and a second item characteristic to be located within the first text; and
    provide the text data as a single input to a machine learning model and extract information regarding each of the plurality of item characteristics in a single pass by:
        determining a first set of output embeddings based on the first text;
        determining a second set of output embeddings based on the second text;
        determining a first portion of the second set of output embeddings that is associated with the first item characteristic;
        determining, based on the first set of output embeddings and the first portion of the second set of output embeddings, a first set of interaction embeddings;
        determining, using the first set of interaction embeddings, a first set of label predictions that indicate at least one first embedding of the first set of interaction embeddings as being associated with the first item characteristic;
        determining a second portion of the second set of output embeddings that is associated with the second item characteristic;
        determining, based on the first set of output embeddings and the second portion of the second set of output embeddings, a second set of interaction embeddings;
        determining, using the second set of interaction embeddings, a second set of label predictions that indicate at least one second embedding of the second set of interaction embeddings as being associated with the second item characteristic; and
        generating output that associates the at least one first embedding with the first item characteristic and the at least one second embedding with the second item characteristic.

2. The system of claim 1, wherein the text data further includes:
    a first characteristic token associated with a first portion of the second text that indicates the first item characteristic; and
    a second characteristic token associated with a second portion of the second text that indicates the second item characteristic;
    and wherein:
        the first portion of the second set of output embeddings is determined based on the first characteristic token associated with the first portion of the second text; and
        the second portion of the second set of output embeddings is determined based on the second characteristic token associated with the second portion of the second text.

3. The system of claim 1, wherein:
    the first set of interaction embeddings is determined based on a first element-wise product of the first set of output embeddings and the first portion of the second set of output embeddings; and
    the second set of interaction embeddings is determined based on a second element-wise product of the first set of output embeddings and the second portion of the second set of output embeddings.

4. A method comprising:
    accessing text data that includes first text and second text, wherein the second text is associated with a plurality of characteristics that include at least a first characteristic and a second characteristic; and
    providing the text data as an input to a machine learning model and extracting information regarding each of the plurality of characteristics in a single pass by:
        determining a first set of output embeddings based on the first text;
        determining a second set of output embeddings based on the second text;
        determining a first portion of the second set of output embeddings that is associated with the first characteristic;
        determining a first set of interaction embeddings based on the first set of output embeddings and the first portion of the second set of output embeddings;
        determining a first set of label predictions that associate at least one first embedding of the first set of interaction embeddings with the first characteristic;
        determining a second portion of the second set of output embeddings that is associated with the second characteristic;
        determining a second set of interaction embeddings based on the first set of output embeddings and the second portion of the second set of output embeddings;
        determining a second set of label predictions that associate at least one second embedding of the second set of interaction embeddings with the second characteristic; and
        determining output based on one or more of the first set of label predictions or the second set of label predictions.

5. The method of claim 4, wherein the first text and the second text are separated by a separator token, the method further comprising determining the first text and the second text by determining the separator token in the text data.

6. The method of claim 4, wherein:
    the text data includes a first characteristic token associated with a first portion of the second text that is associated with the first characteristic; and
    one or more of: the first portion of the second set of output embeddings or the second portion of the second set of output embeddings are determined based on the first characteristic token associated with the first portion of the second text.

7. The method of claim 6, wherein:
    the text data further includes a second characteristic token associated with a second portion of the second text that is associated with the second characteristic; and
    the second portion of the of the second set of output embeddings is determined based on the second characteristic token associated with the second portion of the second text.

8. The method of claim 4, wherein one or more of:
    the first portion of the second set of output embeddings includes at least two first tokens that are associated with the first characteristic; or
    the second portion of the second set of output embeddings includes at least two second tokens that are associated with the second characteristic.

9. The method of claim 4, wherein:
the text data includes an initial token that precedes the first text and the second text;
the first text does not include text associated with the first characteristic; and
the at least one first embedding associated with the first set of label predictions is associated with the initial token.

10. The method of claim 4, wherein one or more of:
the first set of interaction embeddings are determined based on a first product of the first set of output embeddings and the first portion of the second set of output embeddings; or
the second set of interaction embeddings are determined based on a second product of the first set of output embeddings and the second portion of the second set of output embeddings.

11. The method of claim 4, wherein the text data further includes a plurality of input embeddings, and at least a portion of the plurality of input embeddings each include one or more of:
a first value indicative of a word included in one or more of the first text or the second text;
a second value indicative of a character included in the one or more of the first text or the second text;
a third value indicative of a position of at least one portion of the one or more of the first text or the second text relative to at least one other portion of the one or more of the first text or the second text; or
a fourth value indicative of association of an input embedding with the first text or the second text.

12. The method of claim 4, wherein the machine learning model includes one or more of: a Bidirectional Encoder Representations from Transformers (BERT) model or a Multilingual Bidirectional Encoder Representations from Transformers (M-BERT) model.

13. The method of claim 4, further comprising:
determining a cross-entropy loss function based on the first set of interaction embeddings and the second set of interaction embeddings; and
training the machine learning model to minimize a value associated with the cross-entropy loss function.

14. The method of claim 4, wherein the first text is associated with an item for purchase, and one or more of the first characteristic or the second characteristic include one or more of a brand, a color, a size, or a category associated with the item.

15. A system comprising:
one or more memories storing computer-executable instructions; and
one or more hardware processors to execute the computer-executable instructions to:
access text data that includes:
first text; and
second text associated with a plurality of characteristics that include at least a first characteristic and a second characteristic, wherein a first portion of the second text associated with the first characteristic is further associated with a first characteristic token, and a second portion of the second text associated with the second characteristic is further associated with a second characteristic token; and
provide the text data as an input to a machine learning model and extract information regarding each of the plurality of characteristics in a single pass by:
determining a first set of output embeddings based on the first text;
determining a second set of output embeddings based on the second text;
determining a first portion of the second set of output embeddings that is associated with the first characteristic based on the first characteristic token;
determining a second portion of the second set of output embeddings that is associated with the second characteristic based on the second characteristic token;
based on the first set of output embeddings and the first portion of the second set of output embeddings, determining a first association between at least one first token of the first text and the first characteristic;
based on the first set of output embeddings and the second portion of the second set of output embeddings, determining a second association between at least one second token of the first text and the second characteristic; and
determining output based on one or more of the at least one first token of the first text or the at least one second token of the first text.

16. The system of claim 15, further comprising computer-executable instructions to:
determine a first set of interaction embeddings based on the first set of output embeddings and the first portion of the second set of output embeddings, wherein the first association is determined based on the first set of interaction embeddings; and
determine a second set of interaction embeddings based on the first set of output embeddings and the second portion of the second set of output embeddings, wherein the second association is determined based on the second set of interaction embeddings.

17. The system of claim 16, wherein one or more of:
the first set of interaction embeddings is determined based on a first product of the first set of output embeddings and the first portion of the second set of output embeddings; or
the second set of interaction embeddings is determined based on a second product of the first set of output embeddings and the second portion of the second set of output embeddings.

18. The system of claim 15, wherein the first portion of the second text includes a plurality of words and the first set of output embeddings includes a plurality of tokens that are preceded by a first output embedding determined based on the first characteristic token.

19. The system of claim 15, wherein the first association indicates a probability that the at least one first token is associated with the first characteristic.

20. The system of claim 15, wherein the first text is associated with an item for purchase, and one or more of the first characteristic or the second characteristic include one or more of a brand, a color, a size, or a category associated with the item.

* * * * *